United States Patent
Wu et al.

(10) Patent No.: US 11,695,496 B2
(45) Date of Patent: Jul. 4, 2023

(54) MODULATION AND CODING SCHEME CONFIGURATION DETERMINATION

(71) Applicant: QUALCOMM Incorporated, San Diego, CA (US)

(72) Inventors: Shuanshuan Wu, San Diego, CA (US); Sudhir Kumar Baghel, Hillsborough, NJ (US); Arjun Bharadwaj, Poway, CA (US); Kapil Gulati, Hillsborough, NJ (US); Shailesh Patil, San Diego, CA (US); Tien Viet Nguyen, Bridgewater, NJ (US); Zhibin Wu, Sunnyvale, CA (US)

(73) Assignee: QUALCOMM Incorporated, San Diego, CA (US)

(*) Notice: Subject to any disclaimer, the term of this patent is extended or adjusted under 35 U.S.C. 154(b) by 4 days.

(21) Appl. No.: 16/566,471

(22) Filed: Sep. 10, 2019

(65) Prior Publication Data

US 2020/0106547 A1    Apr. 2, 2020

Related U.S. Application Data

(60) Provisional application No. 62/737,390, filed on Sep. 27, 2018.

(51) Int. Cl.
*H04L 1/00*    (2006.01)
*H04W 4/70*    (2018.01)
(Continued)

(52) U.S. Cl.
CPC ............. *H04L 1/0005* (2013.01); *H04W 4/46* (2018.02); *H04W 4/70* (2018.02); *H04W 8/24* (2013.01); *H04W 24/10* (2013.01)

(58) Field of Classification Search
CPC ......... H04W 4/70; H04W 24/10; H04W 4/46; H04W 8/24; H04L 1/0005
See application file for complete search history.

(56) References Cited

U.S. PATENT DOCUMENTS

| | | | |
|---|---|---|---|
| 2014/0192732 A1* | 7/2014 | Chen | H04L 1/0025 370/328 |
| 2019/0260495 A1* | 8/2019 | Nammi | H04L 1/0016 |

(Continued)

FOREIGN PATENT DOCUMENTS

| | | |
|---|---|---|
| EP | 2903231 A1 | 8/2015 |
| JP | 2015529428 A * | 10/2015 |
| WO | 2018203990 A1 | 11/2018 |

OTHER PUBLICATIONS

Huawei et al., "Coexistence of R14 UEs and R15 UEs regarding 64QAM", 3GPP TSG RAN WG2 Meeting #101 bis, 3GPP Draft; R2-1804633 Coexistence of R14 UES and R15 UES Regarding 64QAM, 3rd Generation Partnership Project (3GPP), Mobile Competence Centre, 650, Route Des Lucioles; F-06921 Sophia-Antipolis Cedex, France, vol. RAN WG2, No. Sanya, China; Apr. 16, 2018-Apr. 20, 2018, Apr. 14, 2018 (Apr. 14, 2018), pp. 1-3, XP051428350, Retrieved from the Internet: URL: http://www.3gpp.org/ftp/Meetings%5F3GPP%5FSYNC/RAN2/Docs/[retrieved on Apr. 14, 2018].

(Continued)

*Primary Examiner* — Samina F Choudhry
(74) *Attorney, Agent, or Firm* — Harrity & Harrity, LLP\Qualcomm Incorporated

(57) ABSTRACT

Various aspects of the present disclosure generally relate to wireless communication. In some aspects, a user equipment (UE) may determine, for a device-to-device communication with another UE, a modulation and coding scheme (MCS) configuration, of a set of MCS configurations, based at least in part on at least one of a transmission mode, a packet (Continued)

characteristic, a mobility state of the UE, a capability of the UE, a transmission mode of the device-to-device communication, a received indication from the other UE, or a combination thereof. The UE may transmit, to the other UE, data using an MCS selected based at least in part on the MCS configuration. Numerous other aspects are provided.

47 Claims, 6 Drawing Sheets

(51) Int. Cl.
　　*H04W 4/46*　　(2018.01)
　　*H04W 24/10*　　(2009.01)
　　*H04W 8/24*　　(2009.01)

(56) References Cited

U.S. PATENT DOCUMENTS

| | | | | |
|---|---|---|---|---|
| 2019/0356451 A1* | 11/2019 | Zhang | .................. | H04B 17/327 |
| 2020/0053835 A1* | 2/2020 | Ye | ......................... | H04L 1/0003 |
| 2021/0298052 A1* | 9/2021 | Namba | ................. | H04L 1/1812 |

OTHER PUBLICATIONS

Interdigital Inc: "NR Sidelink Physical Layer Structures and Procedures", 3GPP TSG RAN WG1 Meeting #94, 3GPP Draft; R1-1809094 NR Sidelink Physical Layer Structures and Procedures, 3rd Generation Partnership Project (3GPP), Mobile Competence Centre, 650, Route Des Lucioles; F-06921 Sophia-Antipolis Cedex, France, vol. RAN WG1, No. Gothenburg, Sweden; Aug. 20, 2018-Aug. 24, 2018, Aug. 11, 2018 (Aug. 11, 2018), 5 Pages, XP051516463, Retrieved from the Internet: URL: http://www.3gpp.org/ftp/tsg%5Fran/WG1%5FRL1/TSGR1%5F94/Docs/R1%2D1809094%2Ezip [retrieved on Aug. 11, 2018], Section 2.4.

Interdigital Inc: "Uu Interface Enhancement for NR Sidelink", 3GPP TSG RAN WG1 Meeting #94, 3GPP Draft; R1-1809096 UU Interface Enhancement for NR Sidelink, 3rd Generation Partnership Project (3GPP), Mobile Competence Centre, 650, Route Des Lucioles; F-06921 Sophia-Antipolis Cedex, France, vol. RAN WG1, No. Gothenburg, Sweden; Aug. 20, 2018-Aug. 24, 2018, Aug. 11, 2018 (Aug. 11, 2018), 3 Pages, XP051516465, Retrieved from the Internet: URL: http://www.3gpp.org/ftp/tsg%5Fran/WG1%5FRL1/TSGR1%5F94/Docs/R1%2D1809096%2Ezip [retrieved on Aug. 11, 2018], Sections 2.1, 2.2 and 2.3.

International Search Report and Written Opinion—PCT/US2019/050631—ISA/EPO—dated Dec. 10, 2019.

* cited by examiner

MODULATION AND CODING SCHEME CONFIGURATION DETERMINATION

RELATED APPLICATIONS

This application claims priority to U.S. Provisional Patent Application No. 62/737,390, filed on Sep. 27, 2018, entitled "MODULATION AND CODING SCHEME CONFIGURATION DETERMINATION," which is hereby expressly incorporated by reference herein.

INTRODUCTION

Aspects of the present disclosure generally relate to wireless communication, and more particularly to techniques and apparatuses for modulation and coding scheme configuration determination.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method may include determining, by a UE and for a device-to-device communication with another UE, a modulation and coding scheme (MCS) configuration based at least in part on a transmission mode, a packet characteristic, or a combination thereof. In some aspects, the method may include transmitting, by the UE and to the other UE, data using an MCS selected based at least in part on the MCS configuration. Other aspects may include UEs, non-transitory computer-readable media, apparatuses, and/or the like.

In some aspects, a method may include determining, by a UE for a device-to-device communication with another UE, an MCS configuration based at least in part on at least one of a transmission mode, a packet characteristic, or a combination thereof. The method may include receiving, from the other UE, data using an MCS selected based at least in part on the MCS configuration. Other aspects may include UEs, non-transitory computer-readable media, apparatuses, and/or the like.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
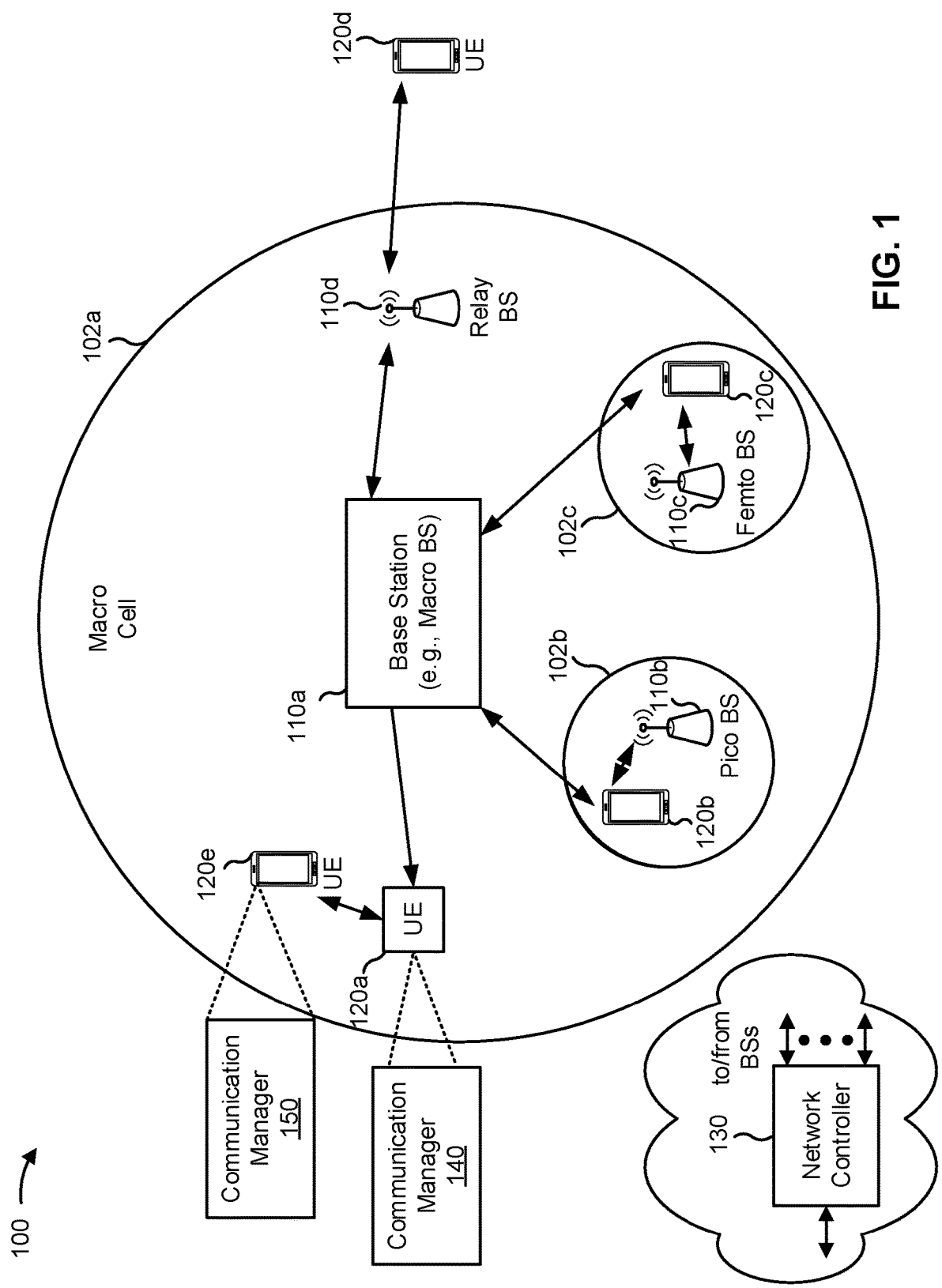
FIG. 1 is a block diagram conceptually illustrating an example of a wireless communication network, in accordance with various aspects of the present disclosure.

In some communications systems, two or more subordinate entities (e.g., UEs) may communicate with each other using sidelink signals. Real-world applications of such sidelink communications may include public safety, proximity services, UE-to-network relaying, vehicle-to-vehicle (V2V) communications, vehicle-to-everything (V2X) communications, Internet of Everything (IoE) communications, IoT communications, mission-critical mesh, peer-to-peer (P2P) communications, and/or various other suitable applications. Generally, a sidelink signal may refer to a signal communicated from one subordinate entity to another subordinate entity without relaying that communication through a scheduling entity (e.g., a UE or a BS), even though, in one example, the scheduling entity may be utilized for scheduling and/or control purposes. In some examples, the sidelink signals may be communicated using a licensed spectrum (unlike wireless local area networks, which typically use an unlicensed spectrum). Although some aspects described herein are described in terms of a UE being a subordinate entity, other configurations are possible, such as a BS being a subordinate entity.

A plurality of modulation and coding scheme (MCS) configurations may be available for utilization in data transmission in some communications systems. For example, a UE may store a first MCS table including a first set of MCSs, a second MCS table including a second set of MCSs, and/or the like, and may use an MCS selected from the first MCS table, the second MCS table, and/or the like for encoding data for transmission. Although some aspects described herein are described in terms of an MCS table, other data structures and/or organizational techniques are possible for storing information identifying different MCSs for use in communication.

During communication with a scheduling entity, such as a BS, the scheduling entity may select an MCS configuration that a subordinate entity is to use. For example, the BS may select the first MCS table for a UE to use in communicating with the BS. In this case, as an example, the UE may select an MCS from the first MCS table, and may use the selected MCS from the first MCS table for communicating with the BS. However, in device-to-device communications, a scheduling entity may not be in communication with subordinate entities to select an MCS configuration. Additionally, or alternatively, providing channel condition information to the scheduling entity and/or receiving information identifying a selection of an MCS configuration from the scheduling entity may delay communications and use network resources.

Some aspects described herein enable modulation and coding scheme (MCS) configuration determination for device-to-device communications, in which a device directly transmits and/or receives signal to or from another device, such as for 3GPP sidelink, vehicle-to-vehicle communications, peer-to-peer communications, and/or the like. For example, a first UE may determine an MCS configuration (e.g., the first UE may select an MCS table from a plurality of MCS tables) based at least in part on a capability of the first UE, a transmission mode of the device-to-device communications, a received indication from a second UE, and/or the like, and may use the determined MCS configuration for transmission to the second UE. In this way, device-to-device communications using a plurality of MCS configurations is enabled, thereby improving network flexibility relative to using a single MCS configuration, improving a utilization of network resources.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network, a 5G or NR network, and/or the like. Wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a g Node B (gNB), a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may be coupled to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c, 120d, 120e) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

Some UEs may perform device-to-device communications (e.g., sidelink or peer-to-peer communications) as subordinate entities. For example, as shown in FIG. 1, UE 120a may communicate with UE 120e as subordinate entities to scheduling entity BS 110a. In this case, UE 120a and UE 120e may operate without BS 110a providing configuration information. For example, UE 120a and UE 120e may determine an MCS configuration without receiving an indication of the MCS configuration from BS 110a, and may communicate using the MCS configuration. Although some aspects described herein are described in terms of UEs 120 using techniques for MCS configuration determination to perform device-to-device communications as subordinate entities, other configurations are possible, such as a relay BS 110d, a pico BS 110b, and/or the like being configured as subordinate entities and using techniques for MCS configuration determination to enable communication with other subordinate entities.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

As shown in FIG. 1, the UE 120a may include a communication manager 140. As described in more detail elsewhere herein, the communication manager 140 may determine, for a device-to-device communication with another UE (e.g., UE 120e), a modulation and coding scheme (MCS) configuration, of a set of MCS configurations, based at least in part on at least one of a capability of the UE, a transmission mode of the device-to-device communication, a received indication from the other UE, or a combination thereof (e.g., as described in more detail herein with regard to FIG. 3); transmit, to the other UE, data using an MCS selected based at least in part on the MCS configuration; and/or the like. Additionally, or alternatively, the communication manager 140 may perform one or more other operations described herein.

As shown in FIG. 1, the UE 120e may include a communication manager 150. As described in more detail elsewhere herein, the communication manager 150 may determine, for a device-to-device communication with another UE, a modulation and coding scheme (MCS) configuration, of a set of MCS configurations, based at least in part on at least one of a capability of the UE, a transmission mode of the device-to-device communication, a received indication from the other UE, or a combination thereof (e.g., as described herein in more detail with regard to FIG. 3); receive, from the other UE, data using an MCS selected based at least in part on the MCS configuration; and/or the like; and/or the like. Additionally, or alternatively, the communication manager 140 may perform one or more other operations described herein.

As indicated above, FIG. 1 is provided merely as an example. Other examples may differ from what is described with regard to FIG. 1.

Figure 2:
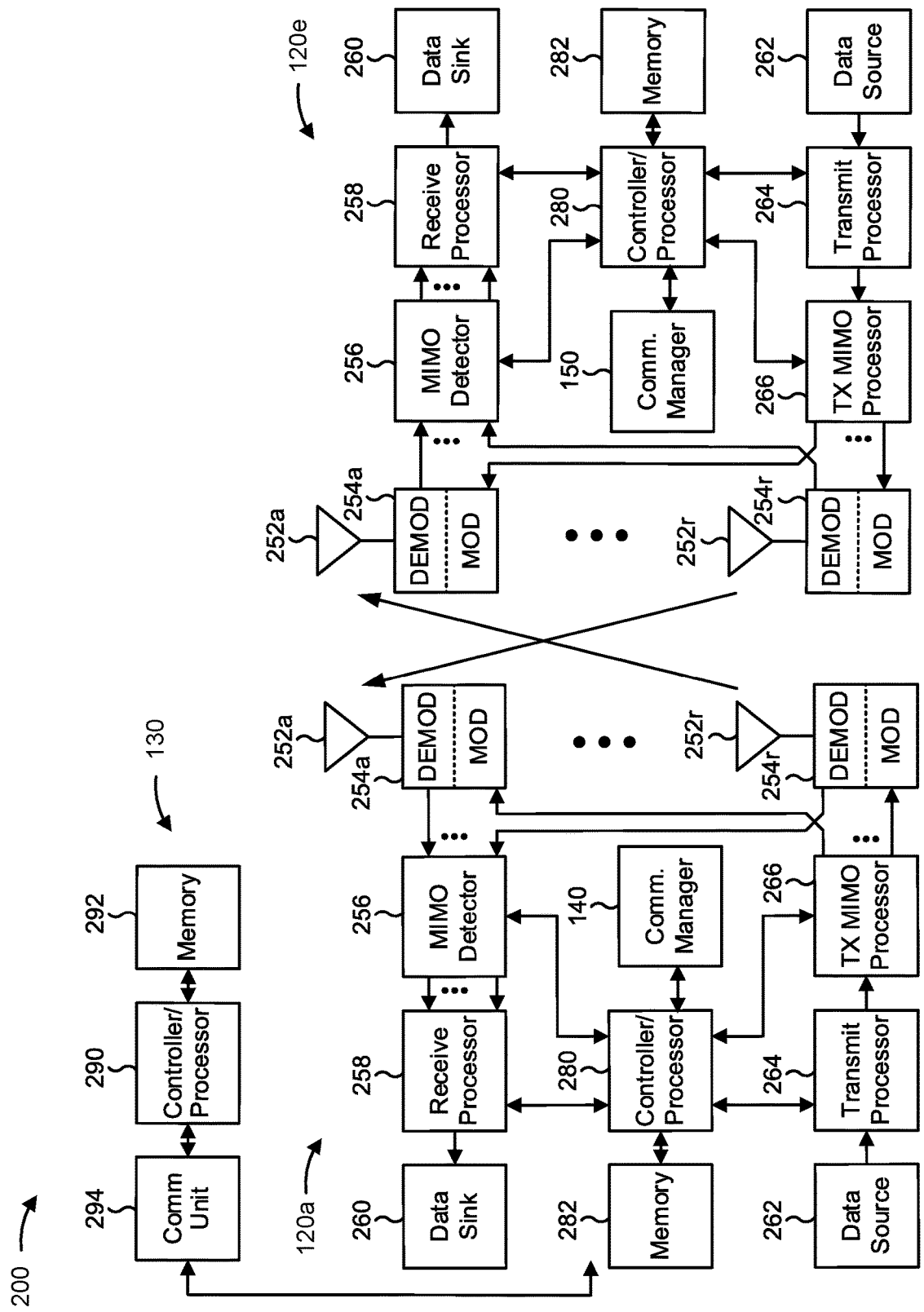
FIG. 2 is a block diagram conceptually illustrating an example of a base station in communication with a user equipment (UE) in a wireless communication network, in accordance with various aspects of the present disclosure.

FIG. 2 shows a block diagram of a design 200 of UE 120*a* and UE 120*e*, which may be one of the base stations and one of the UEs in FIG. 1.

At UEs 120*a* and 120*e*, antennas 252*a* through 252*r* may receive the sidelink signals from other UEs (e.g., UE 120*a* may receive from UE 120*e* or UE 120*e* may receive from UE 120*a*) and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UEs 120*a* and 120*e* to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

Further, at UEs 120*a* and 120*e*, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to another UE (e.g., UE 120*a* may transmit to UE 120*e* or UE 120*e* may transmit to UE 120*a*). Network controller 130 may include communication unit 294, controller/processor 290, and memory 292.

Controller/processor 280 of UE 120*a* or UE 120*e*, and/or any other component(s) of FIG. 2 may perform one or more techniques associated with modulation and coding scheme configuration determination, as described in more detail elsewhere herein. For example, controller/processor 280 of UE 120*a* or UE 120*e* and/or any other component(s) of FIG. 2 may perform or direct operations of, for example, process 400 of FIG. 4, process 500 of FIG. 5, and/or other processes as described herein. Memory 282 may store data and program codes for base station 110 and UE 120, respectively.

In some aspects, the UE 120*a* may include means for determining, for a device-to-device communication with another UE, a modulation and coding scheme (MCS) configuration, of a set of MCS configurations, based at least in part on at least one of a transmission mode, a packet characteristic, or a combination thereof, means for transmitting, to the other UE, data using an MCS selected based at least in part on the MCS configuration, and/or the like. In some aspects, such means may include the communication manager 140. Additionally, or alternatively, such means may include one or more components of the UE 120*a* described in connection with FIG. 2.

In some aspects, the UE 120*e* may include means for determining, for a device-to-device communication with another UE, a modulation and coding scheme (MCS) configuration, of a set of MCS configurations, based at least in part on at least one of a transmission mode, a packet characteristic, or a combination thereof, means for receiving, from the other UE, data using an MCS selected based at least in part on the MCS configuration, and/or the like. In some aspects, such means may include the communication manager 150. Additionally, or alternatively, such means may include one or more components of the UE 120*e* described in connection with FIG. 2.

As indicated above, FIG. 2 is provided merely as an example. Other examples may differ from what is described with regard to FIG. 2.

Figure 3A:
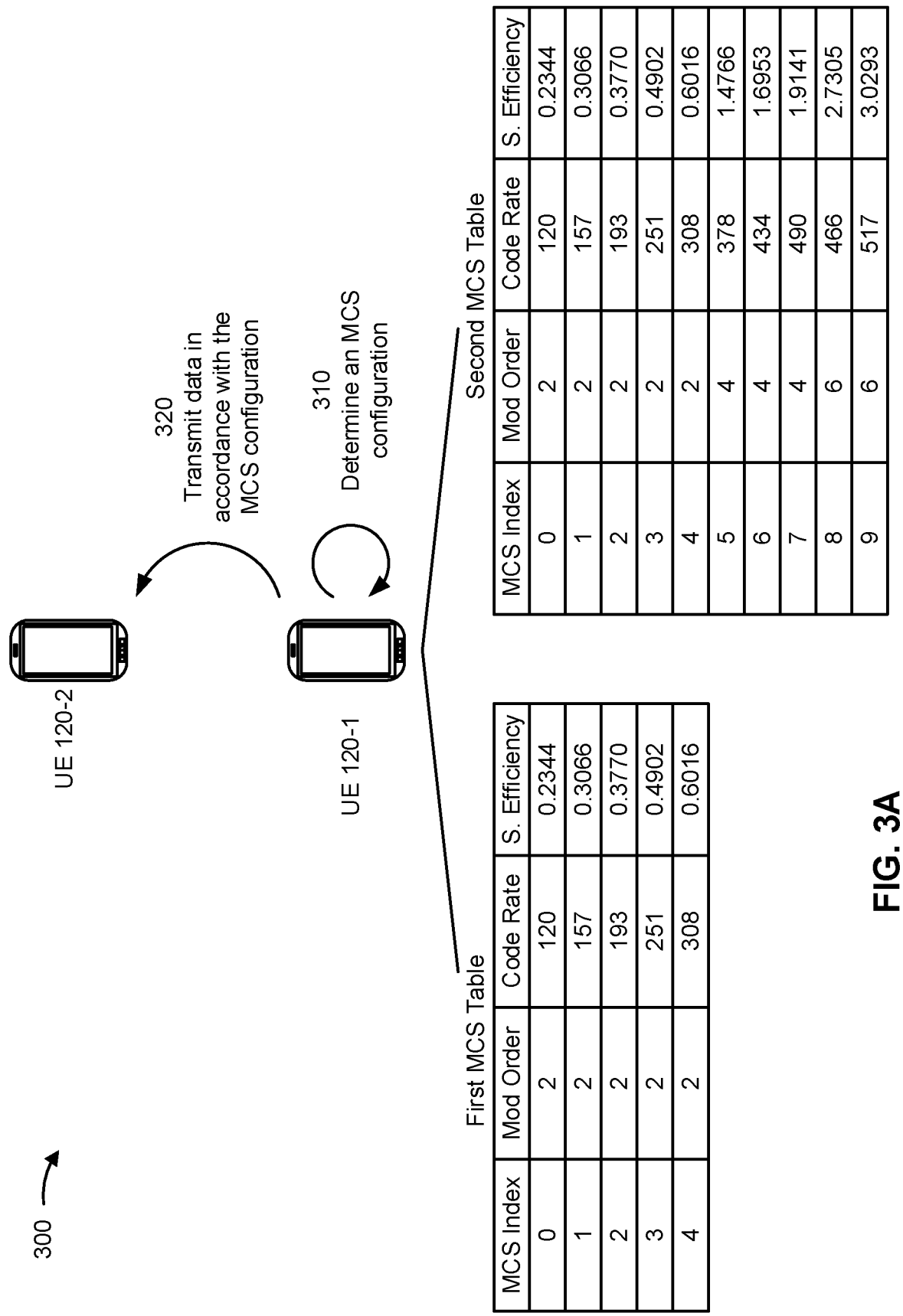
FIGS. 3A and 3B are diagrams illustrating examples of modulation and coding scheme configuration determination, in accordance with various aspects of the present disclosure.
Figure 3B:
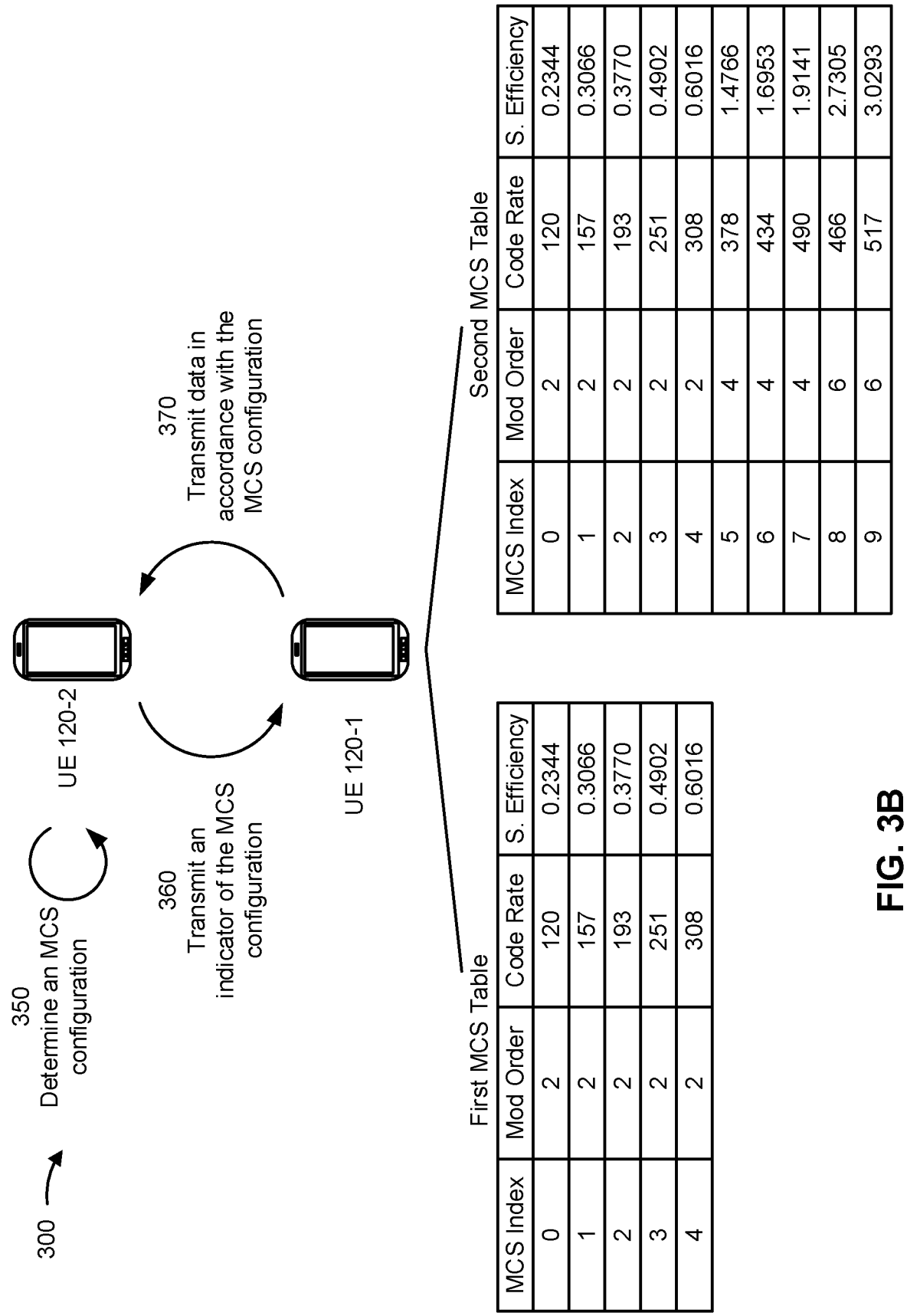

FIGS. 3A and 3B are diagrams illustrating an example 300 of modulation and coding scheme configuration, in accordance with various aspects of the present disclosure. As shown in FIG. 3A, example 300 includes a first UE 120-1 and a second UE 120-2.

As further shown in FIG. 3A, and by reference number 310, first UE 120-1 may determine an MCS configuration. For example, first UE 120-1 may select an MCS table (e.g., a first MCS table, a second MCS table, and/or the like), of a plurality of MCS tables, from which to select an MCS for encoding data for transmission. In some aspects, first UE 120-1 may determine the MCS configuration based at least in part on a transmission mode (e.g., whether unicast or groupcast is enabled), a packet characteristic (e.g., a maximum packet size or transport block size), or a combination thereof. In some aspects, first UE 120-1 may determine the MCS configuration based at least in part on a capability of first UE 120-1. For example, first UE 120-1 may determine the MCS configuration based at least in part on which MCS tables are stored by first UE 120-1, a packet size of packets that first UE 120-1 is to transmit, a maximum modulation order that first UE 120-1 may support, a maximum packet size that first UE 120-1 may support, a maximum transport block size that first UE 120-1 may support, and/or the like. As an example, when first UE 120-1 has the capability of supporting modulation orders up to 64-QAM, first UE 120-1 may select an MCS table that does not include modulation orders greater than 64-QAM. As another example, when first UE 120-1 is to transmit a packet of greater than a threshold quantity of bits, first UE 120-1 may select an MCS table that includes 256-QAM as a modulation order, and when first UE 120-1 is to transmit a packet of less than or equal to the threshold quantity of bits, first UE 120-1 may select another MCS table that includes 64-QAM as a modulation order. In this case, first UE 120-1 may determine the threshold quantity of bits based at least in part on received signaling, a stored default value, and/or the like.

Additionally, or alternatively, first UE 120-1 may determine the MCS configuration based at least in part on a transmission mode (e.g., unicast, groupcast, broadcast, multicast, and/or the like) that first UE 120-1 is to use for transmission. For example, when first UE 120-1 is to transmit a unicast transmission, first UE 120-1 may select an MCS table associated with 256-QAM modulation. Similarly, for groupcast transmission, first UE 120-1 may select an MCS table associated with 64-QAM modulation. Similarly, for broadcast transmission, first UE 120-1 may select an MCS table associated with QPSK modulation. In some aspects, first UE 120-1 may select the MCS configuration based at least in part on a maximum modulation order included in an MCS table. For example, when a maximum modulation order is 64-QAM, first UE 120-1 may select an MCS table that includes modulation orders less than or equal to 64-QAM, such as an MCS table that includes 64-QAM modulation, 16-QAM modulation, QPSK modulation, and/or the like.

As shown in FIG. 3A, and by reference number 320, first UE 120-1 may transmit data in accordance with the MCS configuration. For example, first UE 120-1 may select an MCS index identifying MCS information (e.g., a modulation order (Mod Order), a target code rate (Code Rate), a spectral efficiency (S. Efficiency), and/or the like) from a selected MCS table, and may use the MCS to encode data for transmission to second UE 120-2. In this case, first UE 120-1 may select the MCS index based at least in part on an amount of data to be transmitted, a channel quality, and/or the like. In some aspects, first UE 120-1 may transmit an indication of the MCS configuration and/or the selected MCS. In some aspects, second UE 120-2 may determine the MCS configuration and/or the selected MCS without receiving a transmitted indication, as described in more detail below.

In some aspects, first UE 120-1 may determine the MCS configuration based at least in part on a plurality of factors. For example, first UE 120-1 may receive an indication of a capability of second UE 120-2 (e.g., identifying a maximum modulation order supported by second UE 120-2), and may determine the MCS configuration based at least in part on the capability of second UE 120-2 and a capability of first UE 120-1 (e.g., first UE 120-1 may select a lesser of a maximum modulation order supported by second UE 120-2 and a maximum modulation order supported by first UE 120-1). Additionally, or alternatively, first UE 120-1 may select an MCS table based at least in part on a lesser of a maximum modulation order supported by first UE 120-1 and a maximum modulation order associated with a transmission mode that first UE 120-1 is to use for transmission.

As shown in FIG. 3B, and by reference number 350, second UE 120-2 may determine the MCS configuration. For example, second UE 120-2 may determine the MCS configuration based at least in part on a capability of second UE 120-2 (e.g., a set of MCS tables stored by second UE 120-2, a maximum modulation order supported by second UE 120-2, and/or the like). Additionally, or alternatively, second UE 120-2 may determine the MCS configuration based at least in part on a transmission mode in which second UE 120-2 is to receive a transmission (e.g., unicast, multicast, groupcast, broadcast, and/or the like). Additionally, or alternatively, second UE 120-2 may determine the MCS configuration based at least in part on a received indication from first UE 120-1. Additionally, or alternatively, second UE 120-2 may determine the MCS configuration based at least in part on a plurality of factors, such as a capability of second UE 120-2 and a capability of first UE 120-1.

As further shown in FIG. 3B, and by reference number 360, second UE 120-2 may provide an indication of the MCS configuration to first UE 120-1. For example, based at least in part on second UE 120-2 determining the MCS configuration (e.g., based at least in part on a capability of second UE 120-2), second UE 120-2 may transmit the indication of the MCS configuration to cause first UE 120-1 to use the MCS configuration for data transmission. In some aspects, second UE 120-2 may provide the indication of the MCS configuration during a particular signaling procedure, such as during a connection establishment procedure, during a signal quality measurement procedure (e.g., the MCS configuration may be selected based at least in part on determining a channel quality that is signaled using a channel quality indicator (CQI)), during a periodic broadcast procedure, and/or the like.

As further shown in FIG. 3B, and by reference number 370, second UE 120-2 may receive a data transmission from first UE 120-1 based at least in part on transmitting the indicator of the MCS configuration. For example, first UE 120-1 may use an MCS configuration determined based at least in part on the indicator of the MCS configuration provided by second UE 120-2, and may encode and transmit data using an MCS selected based at least in part on an MCS table identified by the MCS configuration. In this way, first UE 120-1 and second UE 120-2 enable MCS configuration determination, thereby enabling device-to-device communication with a plurality of candidate MCS configurations (e.g., a plurality of MCS tables), which may increase network flexibility and efficiency (e.g., by avoiding retransmission of failed communications).

As indicated above, FIG. 3 is provided as an example. Other examples may differ from what is described with respect to FIG. 3.

Figure 4:
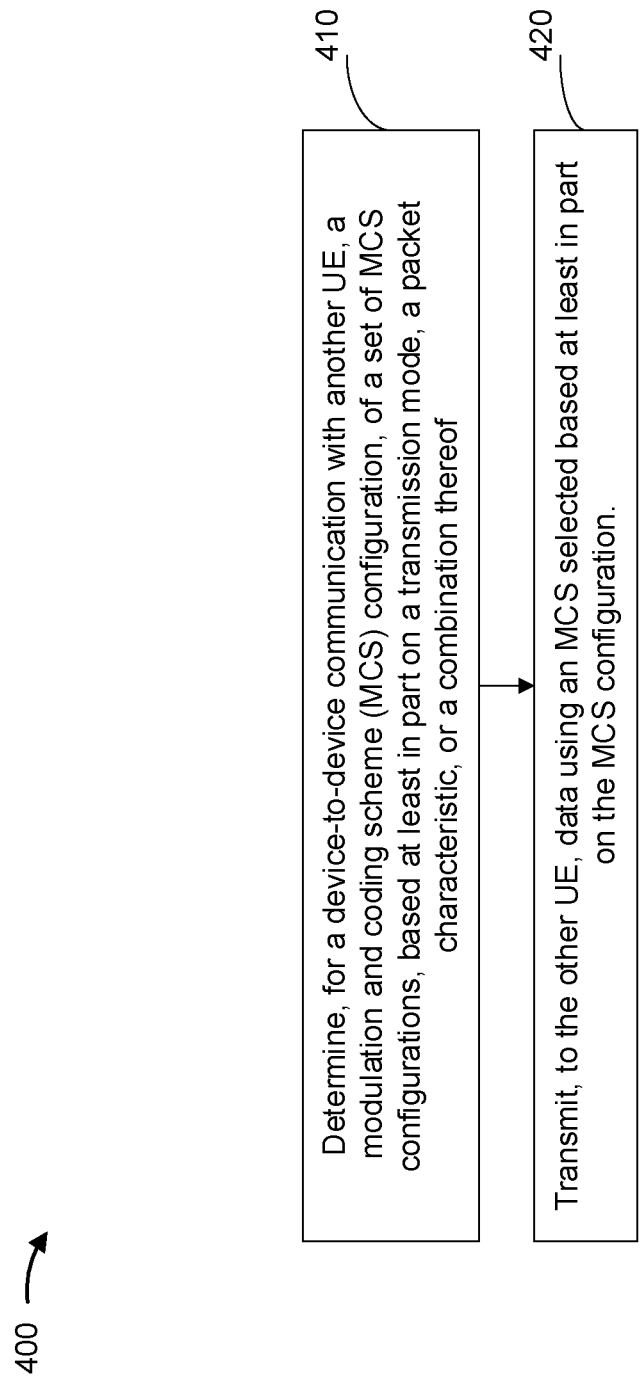
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where a UE (e.g., UE 120 and/or the like) performs operations associated with modulation and coding scheme configuration determination.

As shown in FIG. 4, in some aspects, process 400 may include determining, for a device-to-device communication with another UE, a modulation and coding scheme (MCS) configuration, of a set of MCS configurations, based at least in part on a transmission mode, a packet characteristic, or a combination thereof (block 410). For example, the UE (e.g., using receive processor 258, transmit processor 264, controller/processor 280, memory 282, and/or the like) may determine, for a device-to-device communication with another UE, an MCS configuration, of a set of MCS configurations, based at least in part on a transmission mode, a packet characteristic, or a combination thereof, as described above.

As further shown in FIG. 4, in some aspects, process 400 may include transmitting, to the other UE, data using an MCS selected based at least in part on the MCS configuration (block 420). For example, the UE (e.g., using receive processor 258, transmit processor 264, controller/processor 280, memory 282, and/or the like) may transmit, to the other UE, data using an MCS selected based at least in part on the MCS configuration, as described above.

Process 400 may include additional aspects, such as any single aspect or any combination of aspects described below and/or in connection with one or more other processes described elsewhere herein.

In a first aspect, determining the MCS configuration includes determining the MCS configuration based at least in part on at least one of a capability of the UE, a transmission mode of the device-to-device communication, a received indication from the other UE, or a combination thereof.

In a second aspect, alone or in combination with the first aspect, the UE is configured to determine the MCS configuration based at least in part on a capability of the UE.

In a third aspect, alone or in combination with one or more of the first and second aspects, the capability of the UE relates to at least one of one or more MCS configurations usable by the UE, a maximum modulation order parameter, a maximum packet size parameter, a maximum transport block size parameter, or a combination thereof.

In a fourth aspect, alone or in combination with one or more of the first through third aspects, the UE is configured to determine the MCS configuration based at least in part on a transmission mode of the device-to-device communication.

In a fifth aspect, alone or in combination with one or more of the first through fourth aspects, the transmission mode corresponds to at least one MCS configuration of the set of MCS configurations.

In a sixth aspect, alone or in combination with one or more of the first through fifth aspects, the transmission mode is one of a unicast transmission mode, a groupcast transmission mode, a multicast transmission mode, a broadcast transmission mode, or a combination thereof.

In a seventh aspect, alone or in combination with one or more of the first through sixth aspects, the UE is configured to determine the MCS configuration based at least in part on a received indication from the other UE.

In an eighth aspect, alone or in combination with one or more of the first through seventh aspects, the received indication includes information identifying at least one of a capability of the other UE, the MCS configuration selected by the other UE.

In a ninth aspect, alone or in combination with one or more of the first through eighth aspects, the UE is configured to receive the received indication in connection with at least one of a connection establishment procedure, a signal quality measurement procedure, an indicator broadcasting procedure.

In a tenth aspect, alone or in combination with one or more of the first through ninth aspects, the UE is configured to determine the MCS configuration based at least in part on two or more of a capability of the UE, a transmission mode of the device-to-device communication, or a received indication from the other UE.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
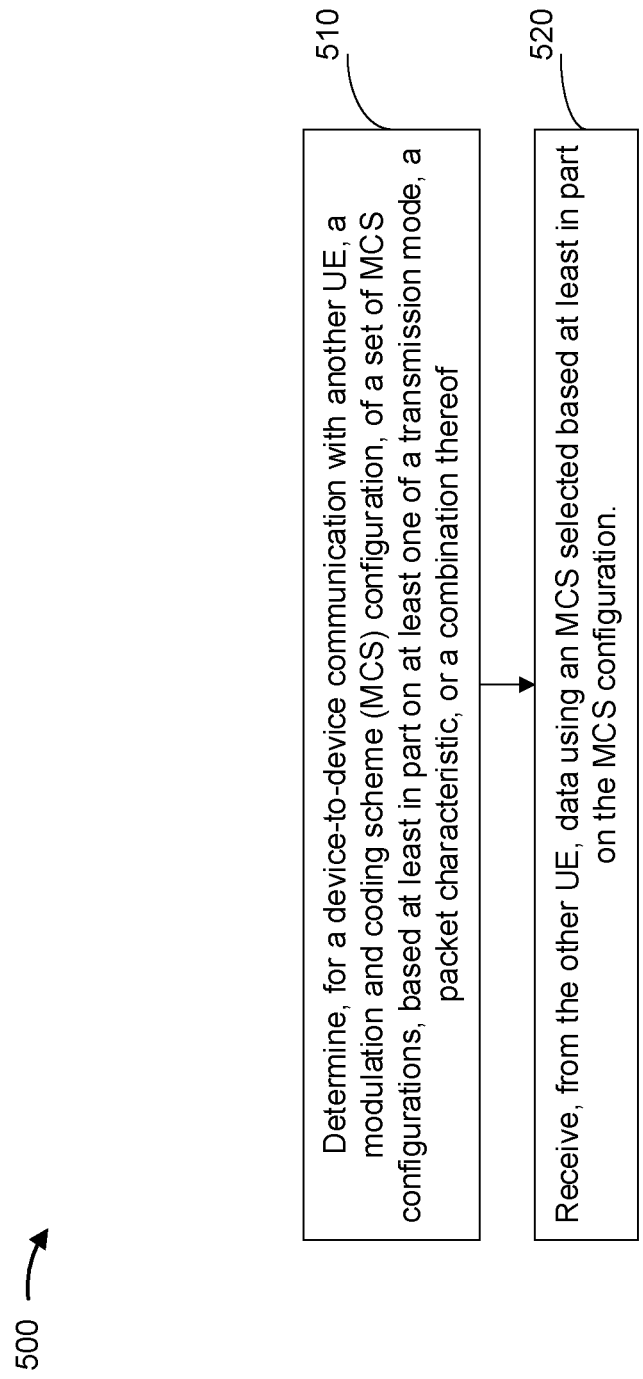
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where a UE (e.g., UE 120 and/or the like) performs operations associated with modulation and coding scheme configuration determination.

As shown in FIG. 5, in some aspects, process 500 may include determining, for a device-to-device communication with another UE, a modulation and coding scheme (MCS) configuration, of a set of MCS configurations, based at least in part on at least one of a transmission mode, a packet characteristic, or a combination thereof (block 510). For example, the UE (e.g., using receive processor 258, transmit processor 264, controller/processor 280, memory 282, and/ or the like) may determine, for a device-to-device communication with another UE, an MCS configuration, of a set of MCS configurations, based at least in part on at least one of a transmission mode, a packet characteristic, or a combination thereof, as described above.

As further shown in FIG. 5, in some aspects, process 500 may include receiving, from the other UE, data using an MCS selected based at least in part on the MCS configuration (block 520). For example, the UE (e.g., using receive processor 258, transmit processor 264, controller/processor 280, memory 282, and/or the like) may receive, from the other UE, data using an MCS selected based at least in part on the MCS configuration, as described above.

Process 500 may include additional aspects, such as any single aspect or any combination of aspects described below and/or in connection with one or more other processes described elsewhere herein.

In a first aspect, determining the MCS configuration includes determining the MCS configuration based at least in part on at least one of a capability of the UE, a transmission mode of the device-to-device communication, a received indication from the other UE, or a combination thereof.

In a second aspect, alone or in combination with the first aspect, the capability of the UE relates to at least one of one or more MCS configurations usable by the other UE, a maximum modulation order parameter, a maximum packet size parameter, a maximum transport block size parameter, or a combination thereof.

In a third aspect, alone or in combination with one or more of the first and second aspects, the transmission mode corresponds to at least one MCS configuration of the set of MCS configurations.

In a fourth aspect, alone or in combination with one or more of the first through third aspects, the transmission mode is at least one of a unicast transmission mode, a groupcast transmission mode, a multicast transmission mode, a broadcast transmission mode, or a combination thereof.

In a fifth aspect, alone or in combination with one or more of the first through fourth aspects, the UE is configured to provide an indicator of the MCS configuration to the other UE.

In a sixth aspect, alone or in combination with one or more of the first through fifth aspects, a received indication includes information identifying at least one of: a capability of the other UE, the MCS configuration selected by the other UE.

In a seventh aspect, alone or in combination with one or more of the first through sixth aspects, the UE is configured to receive the received indication or provide an indication of the MCS configuration in connection with at least one of: a connection establishment procedure, a signal quality measurement procedure, an indicator broadcasting procedure.

In an eighth aspect, alone or in combination with one or more of the first through seventh aspects, the UE is configured to determine the MCS configuration based at least in part on two or more of a capability of the UE, a transmission mode of the device-to-device communication, or a received indication from the other UE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed at a first user equipment (UE), comprising:
   determining, by the first UE and for a device-to-device communication with a second UE, a modulation and coding scheme (MCS) table, of a set of MCS tables, based at least in part on a capability of the second UE and one or more of:
   a packet size of one or more packets that the first UE is to transmit, or
   a packet size that the first UE supports; and
   transmitting, to the second UE, data using an MCS selected based at least in part on the MCS table.

2. The method of claim 1, wherein the MCS table is determined further based on a different capability of the first UE.

3. The method of claim 2, wherein the different capability of the first UE relates to at least one of:
   one or more MCS tables, of the set of MCS tables, usable by the first UE,
   a maximum modulation order parameter, or
   a maximum transport block size parameter.

4. The method of claim 1, wherein the MCS table is determined further based on a transmission mode enabled for the device-to-device communication, and
   wherein the transmission mode corresponds to at least one MCS table of the set of MCS tables.

5. The method of claim 1, wherein the MCS table is determined further based on a received indication from the second UE.

6. The method of claim 5, wherein the received indication includes information identifying
   an MCS table selected by the second UE.

7. The method of claim 5, wherein the received indication is received in connection with at least one of:
   a connection establishment procedure,
   a signal quality measurement procedure, or
   an indicator broadcasting procedure.

8. The method of claim 1, wherein the device-to-device communication is at least one of sidelink communication, vehicle-to-everything (V2X) communication, vehicle-to-vehicle (V2V) communication, or peer-to-peer (P2P) communication.

9. The method of claim 1, wherein the device-to-device communication between the first UE and the second UE is via at least one network relay.

10. A method of wireless communication performed by a first user equipment (UE), comprising:
    determining, by the first UE and for a device-to-device communication with a second UE, a modulation and coding scheme (MCS) table, of a set of MCS tables, based at least in part on a capability of the second UE and one or more of:
    a packet size of one or more packets that the first UE is to transmit, or
    a packet size that the first UE supports; and
    receiving, from the second UE, data using an MCS selected based at least in part on the MCS table.

11. The method of claim 10, wherein the MCS table is determined further based at least in part on a different capability of the first UE.

12. The method of claim 11, wherein the different capability of the first UE relates to at least one of:
    one or more MCS tables, of the set of MCS tables, usable by the first UE,
    a maximum modulation order parameter, or
    a maximum transport block size parameter.

13. The method of claim 10, wherein the MCS table is determined further based on a transmission mode enabled for the device-to-device communication, and
    wherein the transmission mode corresponds to at least one MCS table of the set of MCS tables.

14. The method of claim 10, further comprising:
    providing an indicator of the MCS table to the second UE.

15. The method of claim 10, wherein the MCS table is determined further based on a received indication that includes information identifying an MCS table selected by the second UE.

16. The method of claim 15, wherein the received indication is received or an indication of the MCS table is provided in connection with at least one of:
a connection establishment procedure,
a signal quality measurement procedure, or
an indicator broadcasting procedure.

17. The method of claim 10, wherein the device-to-device communication is at least one of sidelink communication, vehicle-to-everything (V2X) communication, vehicle-to-vehicle (V2V) communication, or peer-to-peer (P2P) communication.

18. The method of claim 10, wherein the device-to-device communication between the first UE and the second UE is via at least one network relay.

19. A first user equipment (UE) for wireless communication, comprising:
a memory; and
one or more processors, coupled to the memory, configured to:
determine, by the first UE and for a device-to-device communication with a second UE, a modulation and coding scheme (MCS) table, of a set of MCS tables, based at least in part on a capability of the second UE and one or more of:
a packet size of one or more packets that the first UE is to transmit, or
a packet size that the first UE supports; and
transmit, to the second UE, data using an MCS selected based at least in part on the MCS table.

20. The first UE of claim 19, further comprising:
an antenna coupled to the one or more processors,
wherein the MCS table is determined further based at least in part on a received indication from the second UE.

21. The first UE of claim 19, wherein the MCS table is determined further based at least in part on a different capability of the first UE.

22. A first user equipment (UE) for wireless communication, comprising:
a memory; and
one or more processors, coupled to the memory, configured to:
determine, by the first UE and for a device-to-device communication with a second UE, a modulation and coding scheme (MCS) table, of a set of MCS tables, based at least in part on a capability of the second UE and one or more of:
a packet size of one or more packets that the first UE is to transmit, or
a packet size that the first UE supports; and
receive, from the other UE, data using an MCS selected based at least in part on the MCS table.

23. The first UE of claim 22, further comprising:
an antenna coupled to the one or more processors,
wherein the MCS table is determined further based at least in part on a received indication from the second UE.

24. The first UE of claim 22,
wherein the MCS table is determined further based at least in part on a different capability of the first UE, and
wherein the different capability of the first UE relates to at least one of:
a maximum modulation order parameter, or
a maximum transport block size parameter, or a combination thereof.

25. The method of claim 1, wherein the MCS table is determined further based on a transmission mode enabled for the device-to-device communication,
wherein, when the transmission mode is a broadcast transmission mode, the MCS table is determined to be a first MCS table of the set of MCS tables based at least in part on the transmission mode being the broadcast transmission mode, and
wherein, when the transmission mode is a unicast transmission mode, the MCS table is selected from the first MCS table and a second MCS table, of the set of MCS tables, based at least in part on the transmission mode being the unicast transmission mode and a capability of the UE.

26. The method of claim 1, wherein the MCS table is determined further based on a transmission mode enabled for the device-to-device communication, and
wherein the MCS table is determined to be an MCS table associated with a first modulation scheme based at least in part on the transmission mode being a unicast transmission mode.

27. The method of claim 1, wherein the MCS table is determined further based on a transmission mode enabled for the device-to-device communication, and
wherein the MCS table is determined to be an MCS table associated with a second modulation scheme based at least in part on the transmission mode being a groupcast transmission mode.

28. The method of claim 1, wherein the MCS table is determined further based on a transmission mode enabled for the device-to-device communication, and
wherein the MCS table is determined to be an MCS table associated with a third modulation scheme based at least in part on the transmission mode being a broadcast transmission mode.

29. A non-transitory computer-readable medium storing instructions for wireless communication, the instructions comprising:
one or more instructions that, when executed by at least one processor of a first user equipment (UE), cause the at least one processor to:
determine, by the first UE and for a device-to-device communication with a second UE, a modulation and coding scheme (MCS) table, of a set of MCS tables, based at least in part on a capability of the second UE and one or more of:
a packet size of one or more packets that the first UE is to transmit, or
a packet size that the first UE supports; and
transmit, to the second UE, data using an MCS selected based at least in part on the MCS table.

30. A first user equipment (UE) for wireless communication, comprising:
means for determining, by the first UE and for a device-to-device communication with a second UE, a modulation and coding scheme (MCS) table, of a set of MCS tables, based at least in part on a capability of the second UE and one or more of:
a packet size of one or more packets that the first UE is to transmit, or
a packet size that the first UE supports; and
means for transmitting, to the second UE, data using an MCS selected based at least in part on the MCS table.

31. A non-transitory computer-readable medium storing instructions for wireless communication, the instructions comprising:

one or more instructions that, when executed by at least one processor of a first user equipment (UE), cause the at least one processor to:
  determine, by the first UE and for a device-to-device communication with a second UE, a modulation and coding scheme (MCS) table, of a set of MCS tables, based at least in part on a capability of the second UE and one or more of:
    a packet size of one or more packets that the first UE is to transmit, or
    a packet size that the first UE supports; and
  receive, from the second UE, data using an MCS selected based at least in part on the MCS table.

32. A first user equipment (UE) for wireless communication, comprising:
  means for determining, for a device-to-device communication with a second UE, a modulation and coding scheme (MCS) table, of a set of MCS tables, based at least in part on a capability of the second UE and one or more of:
    a packet size of one or more packets that the first UE is to transmit, or
    a packet size that the first UE supports; and
  means for receiving, from the second UE, data using an MCS selected based at least in part on the MCS table.

33. The method of claim 1, further comprising:
  selecting the MCS from the MCS table based at least in part on at least one of an amount of data to be transmitted or a channel quality.

34. The method of claim 1, wherein each MCS table, of the set of MCS tables, includes information identifying a modulation order, a code rate, and a spectral efficiency for a plurality of MCS index values.

35. The method of claim 1, wherein determining the MCS table comprises:
  determining the MCS table based at least in part on the capability of the second UE and the packet size of the one or more packets that the first UE is to transmit.

36. The method of claim 1, wherein determining the MCS table comprises:
  determining the MCS table based at least in part on the capability of the second UE and the packet size that the first UE supports.

37. The method of claim 36, wherein the packet size that the first UE supports is a maximum packet size that the first UE supports.

38. The method of claim 10, wherein determining the MCS table comprises:
  determining the MCS table based at least in part on the capability of the second UE and the packet size of the one or more packets that the first UE is to transmit.

39. The method of claim 10, wherein determining the MCS table comprises:
  determining the MCS table based at least in part on the capability of the second UE and the packet size that the first UE supports.

40. The method of claim 39, wherein the packet size that the first UE supports is a maximum packet size that the first UE supports.

41. The first UE of claim 19, wherein the one or more processors are further configured to:
  select the MCS from the MCS table based at least in part on at least one of an amount of data to be transmitted or a channel quality.

42. The first UE of claim 19, wherein, to determine the MCS table, the one or more processors are configured to:
  determine the MCS table based at least in part on the capability of the second UE and the packet size of the one or more packets that the first UE is to transmit.

43. The first UE of claim 19, wherein, to determine the MCS table, the one or more processors are configured to:
  determine the MCS table based at least in part on the capability of the second UE and the packet size that the first UE supports.

44. The first UE of claim 43, wherein the packet size that the first UE supports is a maximum packet size that the first UE supports.

45. The first UE of claim 22, wherein, to determine the MCS table, the one or more processors are configured to:
  determine the MCS table based at least in part on the capability of the second UE and the packet size of the one or more packets that the first UE is to transmit.

46. The first UE of claim 22, wherein, to determine the MCS table, the one or more processors are configured to:
  determine the MCS table based at least in part on the capability of the second UE and the packet size that the first UE supports.

47. The first UE of claim 46, wherein the packet size that the first UE supports is a maximum packet size that the first UE supports.

* * * * *